(12) United States Patent
Wang et al.

(10) Patent No.: US 12,522,384 B2
(45) Date of Patent: Jan. 13, 2026

(54) UNMANNED AERIAL VEHICLE

(71) Applicant: Arashi Vision Inc., Guangdong (CN)

(72) Inventors: Chaorui Wang, Guangdong (CN); Fei Gao, Guangdong (CN)

(73) Assignee: ARASHI VISION INC., Shenzhen (CN)

( * ) Notice: Subject to any disclaimer, the term of this patent is extended or adjusted under 35 U.S.C. 154(b) by 0 days.

(21) Appl. No.: 18/946,962

(22) Filed: Nov. 14, 2024

(65) Prior Publication Data
US 2025/0066049 A1 Feb. 27, 2025

Related U.S. Application Data

(63) Continuation of application No. PCT/CN2023/098686, filed on Jun. 6, 2023.

(30) Foreign Application Priority Data

Jun. 9, 2022 (CN) .......................... 202221459902.8

(51) Int. Cl.
| | |
|---|---|
| *B64U 20/87* | (2023.01) |
| *B64C 25/64* | (2006.01) |
| *B64D 47/08* | (2006.01) |
| *B64U 70/00* | (2023.01) |

(52) U.S. Cl.
CPC .............. *B64U 20/87* (2023.01); *B64C 25/64* (2013.01); *B64D 47/08* (2013.01); *B64U 70/00* (2023.01)

(58) Field of Classification Search
CPC ........ B64U 20/87; B64U 70/00; B64U 60/40; B64U 2101/30; B64C 25/64; B64D 47/08
See application file for complete search history.

(56) References Cited

U.S. PATENT DOCUMENTS

| | | | | |
|---|---|---|---|---|
| 2,019,652 | A * | 11/1935 | Brookley | F41A 19/58 40/213 |
| 3,218,005 | A * | 11/1965 | Calderon | B64C 3/54 244/54 |
| 6,065,720 | A * | 5/2000 | Ash | B64F 5/10 244/120 |
| 8,380,425 | B2 * | 2/2013 | Duggan | G08G 5/57 340/963 |
| 8,882,560 | B2 * | 11/2014 | Sofman | A63F 13/65 446/454 |
| 9,555,873 | B1 * | 1/2017 | Alley | B64C 13/24 |

(Continued)

FOREIGN PATENT DOCUMENTS

| | | |
|---|---|---|
| CN | 203996916 U | 12/2014 |
| CN | 206265292 U | 6/2017 |

(Continued)

OTHER PUBLICATIONS

International Search Report and Written Opinion mailed on Aug. 21, 2023, received for PCT Application PCT/CN2023/098686, filed on Jun. 6, 2023, 9 pages including English Translation.

*Primary Examiner* — Medhat Badawi
(74) *Attorney, Agent, or Firm* — XSENSUS LLP

(57) ABSTRACT

A unmanned aerial vehicle may include a fuselage body, a top lens structure at a top of the fuselage body, the top lens structure protruding from the top of the fuselage body; and a bottom lens module at a bottom of the fuselage body, the bottom lens module protruding from the bottom of the fuselage body.

19 Claims, 5 Drawing Sheets

(56) References Cited

U.S. PATENT DOCUMENTS

| | | | | |
|---|---|---|---|---|
| 10,767,624 | B2* | 9/2020 | Monreal Lesmes | F03D 1/0633 |
| 11,027,584 | B1* | 6/2021 | Kiceniuk, Jr. | B60F 5/02 |
| 11,198,519 | B1* | 12/2021 | Seeley | B64D 29/02 |
| 11,358,700 | B1* | 6/2022 | Poe | B64C 1/0685 |
| 11,450,233 | B2* | 9/2022 | Becker | B23K 9/16 |
| 11,521,512 | B2* | 12/2022 | Marquinez Torrecilla | G06F 1/163 |
| 11,597,490 | B1* | 3/2023 | Gundlach | B64F 5/00 |
| 11,721,231 | B2* | 8/2023 | Becker | G09B 5/02 434/234 |
| 12,202,634 | B1* | 1/2025 | England | B64U 20/87 |
| 12,208,930 | B1* | 1/2025 | Cunningham | G08G 5/32 |
| 12,236,494 | B1* | 2/2025 | Melgar | G06F 21/577 |
| 12,263,969 | B1* | 4/2025 | Little | B64U 60/60 |
| 12,296,993 | B2* | 5/2025 | Torgersen | B64U 50/30 |
| 12,298,771 | B2* | 5/2025 | Mitomo | G05D 1/249 |
| 2008/0149758 | A1* | 6/2008 | Colgren | B64C 9/02 244/45 R |
| 2009/0026321 | A1* | 1/2009 | Sarh | B64C 3/54 244/218 |
| 2009/0166477 | A1* | 7/2009 | Bousfield | B64C 3/56 244/218 |
| 2010/0159434 | A1* | 6/2010 | Lampotang | G09B 23/28 434/365 |
| 2010/0178966 | A1* | 7/2010 | Seydoux | A63F 13/213 463/2 |
| 2011/0036939 | A1* | 2/2011 | Easter | B64C 37/00 244/46 |
| 2011/0130913 | A1* | 6/2011 | Duggan | G05D 1/0088 244/190 |
| 2011/0221692 | A1* | 9/2011 | Seydoux | A63H 30/04 345/173 |
| 2014/0025229 | A1* | 1/2014 | Levien | A63H 27/12 701/2 |
| 2014/0234116 | A1* | 8/2014 | Cussac | F03D 1/0675 29/889.71 |
| 2015/0003991 | A1* | 1/2015 | Bagepalli | F03D 1/0675 29/889.1 |
| 2015/0292477 | A1* | 10/2015 | Kratmann | F03D 1/0675 416/232 |
| 2016/0121992 | A1* | 5/2016 | Saroka | F42B 10/14 244/129.4 |
| 2016/0129984 | A1* | 5/2016 | Tiryaki | B64C 3/187 244/119 |
| 2017/0008611 | A1* | 1/2017 | Murta | B64C 3/185 |
| 2017/0066135 | A1* | 3/2017 | Cohen | H04L 67/12 |
| 2017/0152014 | A1* | 6/2017 | Gould | B64U 50/19 |
| 2017/0185081 | A1* | 6/2017 | Steele | G09B 9/08 |
| 2017/0253316 | A1* | 9/2017 | Benthien | B64C 1/12 |
| 2017/0349281 | A1* | 12/2017 | Quinlan | B64D 1/12 |
| 2018/0067476 | A1* | 3/2018 | Engelbart | G06F 30/17 |
| 2018/0104863 | A1* | 4/2018 | Cottrell | B29C 33/04 |
| 2018/0162540 | A1* | 6/2018 | Iliopoulos | B64F 5/10 |
| 2018/0186472 | A1* | 7/2018 | Wan | H04N 23/698 |
| 2018/0273158 | A1* | 9/2018 | Courtin | B64U 20/80 |
| 2018/0297698 | A1* | 10/2018 | Dhall | B60F 5/02 |
| 2018/0312252 | A1* | 11/2018 | Yates | B64C 31/02 |
| 2018/0334248 | A1* | 11/2018 | Neiser | B64C 23/005 |
| 2018/0354625 | A1* | 12/2018 | Verkade | B64D 9/00 |
| 2018/0355842 | A1* | 12/2018 | Badger | B33Y 80/00 |
| 2019/0051051 | A1* | 2/2019 | Kaufman | G09B 9/06 |
| 2019/0077098 | A1* | 3/2019 | Riley | B29C 70/545 |
| 2019/0077496 | A1* | 3/2019 | Livieratos | B64C 39/10 |
| 2019/0106192 | A1* | 4/2019 | Woodworth | B64U 30/10 |
| 2019/0106195 | A1* | 4/2019 | Wilkerson | F16B 37/044 |
| 2019/0135403 | A1* | 5/2019 | Perry | B64U 10/25 |
| 2019/0143596 | A1* | 5/2019 | Fiechter | B29C 64/00 73/760 |
| 2019/0193829 | A1* | 6/2019 | Schlueter | B64C 1/06 |
| 2019/0224909 | A1* | 7/2019 | Riha | B29C 64/118 |
| 2019/0255777 | A1* | 8/2019 | Fiechter | B23Q 17/2233 |
| 2019/0322032 | A1* | 10/2019 | Riha | B29C 64/106 |
| 2019/0322047 | A1* | 10/2019 | Riha | B33Y 30/00 |
| 2019/0374868 | A1* | 12/2019 | Russell | A63H 27/00 |
| 2019/0381530 | A1* | 12/2019 | Beaudoin | B65H 45/04 |
| 2019/0389555 | A1* | 12/2019 | Guering | B64C 1/061 |
| 2020/0032665 | A1* | 1/2020 | Propheter-Hinckley | F02C 3/04 |
| 2020/0047867 | A1* | 2/2020 | Griess | B64C 1/068 |
| 2020/0180760 | A1* | 6/2020 | Richardson | B64C 5/08 |
| 2020/0188732 | A1* | 6/2020 | Kruger | G06F 3/0346 |
| 2020/0216196 | A1* | 7/2020 | Sohmshetty | B64F 3/00 |
| 2020/0247561 | A1* | 8/2020 | Rivera | B22F 3/1115 |
| 2020/0310408 | A1* | 10/2020 | Carper | G01C 21/165 |
| 2020/0407039 | A1* | 12/2020 | Sanders | B64C 7/00 |
| 2021/0046694 | A1* | 2/2021 | Rowe | B33Y 30/00 |
| 2021/0070419 | A1* | 3/2021 | Decker | B64C 3/18 |
| 2021/0082304 | A1* | 3/2021 | Daley | G06V 40/20 |
| 2021/0094702 | A1* | 4/2021 | Wang | F21V 3/049 |
| 2021/0129979 | A1* | 5/2021 | Wang | B64U 30/299 |
| 2021/0139145 | A1* | 5/2021 | Gao | B64U 20/80 |
| 2021/0174695 | A1* | 6/2021 | Clark | G09B 9/54 |
| 2021/0232873 | A1* | 7/2021 | Kothari | G06V 20/41 |
| 2021/0256875 | A1* | 8/2021 | Mosier | B29C 64/393 |
| 2021/0331789 | A1* | 10/2021 | Wardlaw | B64F 5/10 |
| 2021/0347462 | A1* | 11/2021 | Haack | B64F 5/10 |
| 2021/0372366 | A1* | 12/2021 | Merzhaeuser | F03D 1/0675 |
| 2021/0403143 | A1* | 12/2021 | Alley | B64U 50/13 |
| 2022/0017204 | A1* | 1/2022 | Helou, Jr. | B64C 1/22 |
| 2022/0111956 | A1* | 4/2022 | Jordan | B64C 27/473 |
| 2022/0142422 | A1* | 5/2022 | Giarritta | A47L 11/4025 |
| 2022/0152758 | A1* | 5/2022 | Jones | B64F 5/10 |
| 2022/0153452 | A1* | 5/2022 | Smith | B64F 5/50 |
| 2022/0169400 | A1* | 6/2022 | Seeley | B64F 1/36 |
| 2023/0009190 | A1* | 1/2023 | Stevens | G03B 17/561 |
| 2024/0092510 | A1* | 3/2024 | Muceus | B64U 20/87 |
| 2024/0185736 | A1* | 6/2024 | Prodzenko | G06T 11/00 |
| 2024/0339046 | A1* | 10/2024 | Paull | A61B 34/25 |
| 2024/0371290 | A1* | 11/2024 | Kane | G09B 9/00 |
| 2025/0021101 | A1* | 1/2025 | Koch | G05D 1/2467 |
| 2025/0026506 | A1* | 1/2025 | Robbins-Rothman | B64U 10/14 |
| 2025/0033809 | A1* | 1/2025 | Jiang | G05D 1/2247 |
| 2025/0036143 | A1* | 1/2025 | Lazaridis | G05D 1/689 |
| 2025/0044811 | A1* | 2/2025 | Tanaka | B64U 10/13 |
| 2025/0046940 | A1* | 2/2025 | Bell | H01M 50/269 |
| 2025/0051046 | A1* | 2/2025 | Ben-Moshe | G05D 1/654 |
| 2025/0066049 | A1* | 2/2025 | Wang | B64U 20/87 |
| 2025/0083840 | A1* | 3/2025 | Collings | B64U 10/14 |
| 2025/0108943 | A1* | 4/2025 | Sekiguchi | B64U 80/20 |
| 2025/0115380 | A1* | 4/2025 | Hardt | G06T 7/251 |
| 2025/0116488 | A1* | 4/2025 | Branco Ferreira | H04W 4/02 |
| 2025/0137385 | A1* | 5/2025 | Schafer | F01D 21/003 |
| 2025/0145313 | A1* | 5/2025 | Li | B64F 1/00 |
| 2025/0146847 | A1* | 5/2025 | Wu | B64C 27/08 |
| 2025/0153871 | A1* | 5/2025 | Liu | B64U 20/87 |
| 2025/0155785 | A1* | 5/2025 | Tian | G03B 17/561 |

FOREIGN PATENT DOCUMENTS

| | | |
|---|---|---|
| CN | 107891991 A | 4/2018 |
| CN | 216700123 U | 6/2022 |
| JP | 2018-030430 A | 3/2018 |

* cited by examiner

UNMANNED AERIAL VEHICLE

CROSS-REFERENCE TO RELATED APPLICATIONS

The present application is a continuation of International Application No. PCT/CN2023/098686, filed on Jun. 6, 2023, which claims the priority of Chinese Patent Application No. CN 202221459902.8, filed on Jun. 9, 2022, the content of each of which is incorporated herein by reference in its entirety.

TECHNICAL FIELD

The present disclosure belongs to the technical field of unmanned aerial vehicles (UAV)s, and particularly relates to a kind of UAV.

BACKGROUND

The UAV in the existing technology, when shooting panoramic images, in order to ensure integrity of the panoramic image splicing, generally needs to raise the lens to increase a fusion angle of splicing. The landing gear may block a part of the image, and the landing gear needs to be higher than the lens during the landing to protect the lens. The two states need to be frequently switched, and the UAV usually needs two sets of driving mechanism to drive the lens and the landing gear respectively. Accordingly, the overall structure is complex and the cost is high.

SUMMARY

One purpose of the present disclosure is to overcome deficiencies of the above mentioned prior art, and provides a UAV whose top lens module and landing gear can share a set of driving mechanism, with a simple and reliable structure, which is conducive to weight reduction and has low application cost.

One embodiment of the present disclosure provides a UAV. The UAV may include a fuselage body, a landing gear movably disposed on the fuselage body; a top lens structure movably disposed on the fuselage body; a bottom lens structure at a bottom of the fuselage body, the bottom lens structure being opposite to the top lens structure; and a driver on the fuselage body, the driver being transmission connected to the landing gear and the top lens structure. The driver may be configured to drive the landing gear and the top lens structure to be lowered or raised synchronously so that a bottom end of the landing gear protrudes from a bottom end of the bottom lens structure while the top lens structure retracts into the fuselage body or the landing gear is located outside a field of view of the bottom lens structure while the top lens structure protrudes at least partially over a top of the fuselage body.

The present disclosure provides a UAV in which the top lens module and the landing gear can share a set of driving mechanisms, which can realize the synchronous or simultaneous raising or lowering of the top lens module and the landing gear together, and when the UAV performs panoramic shooting in the flight process, the landing gear is retracted (raised), and at the same time the top lens module is raised with respect to the fuselage body, in order to increase the fusion angle of the splicing and at the same time avoid that the landing gear affects the imaging of the bottom lens module, and it is only necessary to set up a set of driving mechanisms to make the synchronous raising and lowering of the top lens module. It is only necessary to set up a set of drive mechanism to synchronize the top lens module with the landing gear, its structure is simple and reliable, the application cost is low, and is conducive to weight reduction and improves the endurance time.

It should be understood that the above general description and the detailed description that follows are exemplary and explanatory only and do not limit the present application.

BRIEF DESCRIPTION OF THE DRAWINGS

In order to explain the technical features of embodiments of the present disclosure more clearly, the drawings used in the present disclosure are briefly introduced as follow. Obviously, the drawings in the following description are some exemplary embodiments of the present disclosure. Ordinary person skilled in the art may obtain other drawings and features based on these disclosed drawings without inventive efforts.

DETAILED DESCRIPTION

Figure 1:
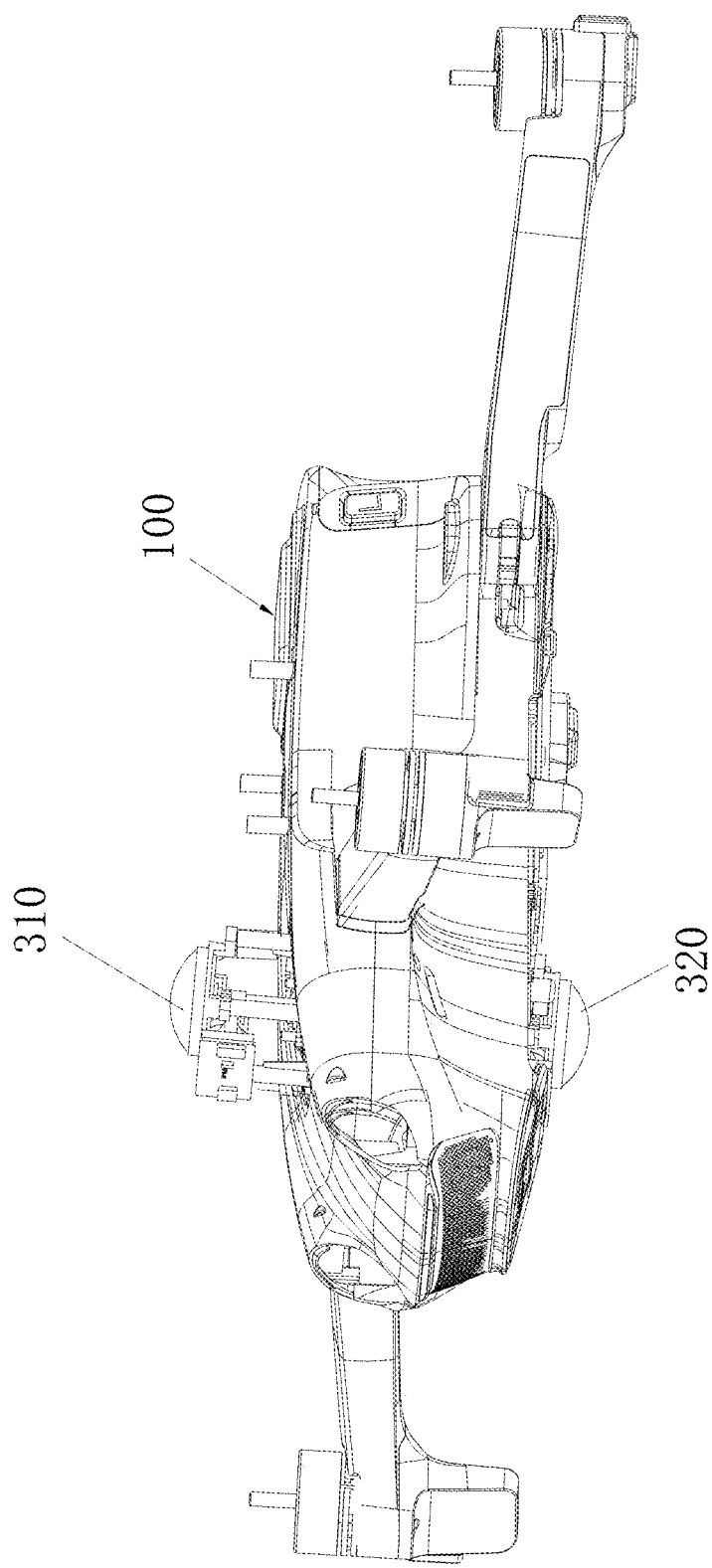
FIG. 1 is a three-dimensional schematic diagram of a top lens module on a UAV in a case that the top lens module is raised with the landing gear according to an embodiment of the disclosure.

In order to make the purpose, technical solutions and advantages of the present application more clearly understood, the following is a further detailed description of the present application in conjunction with the accompanying drawings and embodiments. It should be understood that the specific embodiments described herein are only for the purpose of explaining the present application and are not intended to limit the present application.

It should be noted that when an element is to be "fixed to" or "set on" another element, it may be directly on the another element or there may be an intermediary element or elements therein between. When an element is to be "attached" to another element, it may be directly attached to the other element or there may be an intermediary element or elements therein between.

In addition, in the embodiments of the present disclosure, if there are terms indicating orientation or positional relationships such as "longitudinal", "transverse", "length", "width", "thickness", "up", "down", "front", "back", "left", "right", "vertical", "horizontal", "top", "bottom", "inside", and "outside", they are based on the orientation or positional relationships or the conventional placement state or usage state shown in the drawings, and are only for the convenience of describing the present disclosure and simplifying the description, and do not indicate or imply that the structure, feature, device or element referred to must have a specific orientation or positional relationship, nor must it be constructed and operated in a specific orientation, and therefore cannot be understood as a limitation in the present disclosure. In the description of the present disclosure, unless otherwise indicated, "plurality" means two or more.

Each specific technical feature and each embodiment described in the specific embodiments can be recombined in any suitable way in case of no contradiction. For example, different embodiments can be formed by the recombination of different specific technical features/embodiments, and in order to avoid unnecessary repetitions, the various possible ways of recombining the specific technical features/embodiments in the present disclosure are not separately described.

As shown in FIGS. 1 to 5, an embodiment of the present disclosure provides a UAV. The UAV may include a fuselage body 100, a landing gear 200, a top lens module or structure 310, a bottom lens module or structure 320, and a driving mechanism or driver. The landing gear 200 may be movably disposed on the fuselage body 100, the top lens module 310 may be movably disposed on the fuselage body 100, the bottom lens module 310 may be disposed at a bottom of the fuselage body 100, and the bottom lens module 310 may be disposed opposite to the top lens module 320. The driving mechanism may be provided on the fuselage body 100, the driving mechanism being transmission connected to the landing gear 200 and the top lens module 310 respectively, the driving mechanism being used to drive the landing gear 200 to move so as to cause a bottom end of the landing gear 200 to protrude from a bottom end of the bottom lens module 320, and, at the same time, to cause the top lens module 310 to move in a direction of retracting into an interior of the fuselage body 100. Optionally, the driving mechanism is used to drive the landing gear 200 to move the landing gear 200 in such a way that the bottom end of the landing gear 200 is located outside a field of view of the bottom lens module 320, while at the same time causing the top lens module 310 to partially protrude out of the top of the fuselage body 100. The top lens module 310 and the landing gear 200 may share a common set of driving mechanism, which can realize synchronous raising and lowering of the top lens module 310 and the landing gear 200, so that when panoramic shooting is carried out during the flight, the landing gear 200 is retracted (raised) and at the same time the top lens module 310 is raised with respect to the fuselage body 100 (shown in FIG. 1 and FIG. 3), in order to increase the fusion angle of the splicing and at the same time, prevent the landing gear 200 from affecting the imaging of the bottom lens module 320. Only a set of driving mechanisms need to be set up to synchronize the raising of the top lens module 310 with the landing gear 200. As such, the structure is simple and reliable, has low cost, and is conducive to weight reduction and improved range time.

In one embodiment, the top lens module 310 may include a panoramic camera, and the bottom lens module 320 may include a panoramic camera, with a large imaging perspective. The top lens module 310 and the bottom lens module 320 may be set facing upward and downward, respectively, and the top lens module 310 and the bottom lens module 320 can be set coaxially, with good panoramic imaging effect.

In one embodiment, when the top lens module 310 is raised to an upper stopping point (as shown in FIG. 1), both the fuselage body 100 and the landing gear 200 are located outside the fields of viewing of the top lens module 310 and the bottom lens module 320, without affecting panoramic imaging. The fuselage body 100 includes a main body, arms, paddles and the like. In specific applications, when the landing gear 200 is fully retracted, the top lens module 310 is raised to the upper stopping point. The landing gear 200 may adopt a sliding lifting structure along the longitudinal or vertical direction, i.e. the landing gear 200 may slide longitudinally or vertically relative to the fuselage body 100. The landing gear 200 may also adopt a rotating lifting structure, i.e., one end of the landing gear 200 is hinged to the fuselage body 100, and the other end may be raised and lowered (stowed and lowered) nearer to and farther away from the fuselage body 100.

In one embodiment, the bottom lens module 320 may be fixedly attached to the fuselage body 100, the bottom lens module 320 may be involved in a positioning algorithm of a visual odometer. The bottom lens module 320 is designed to be fixed, thereby improving the algorithm robustness.

Figure 2:
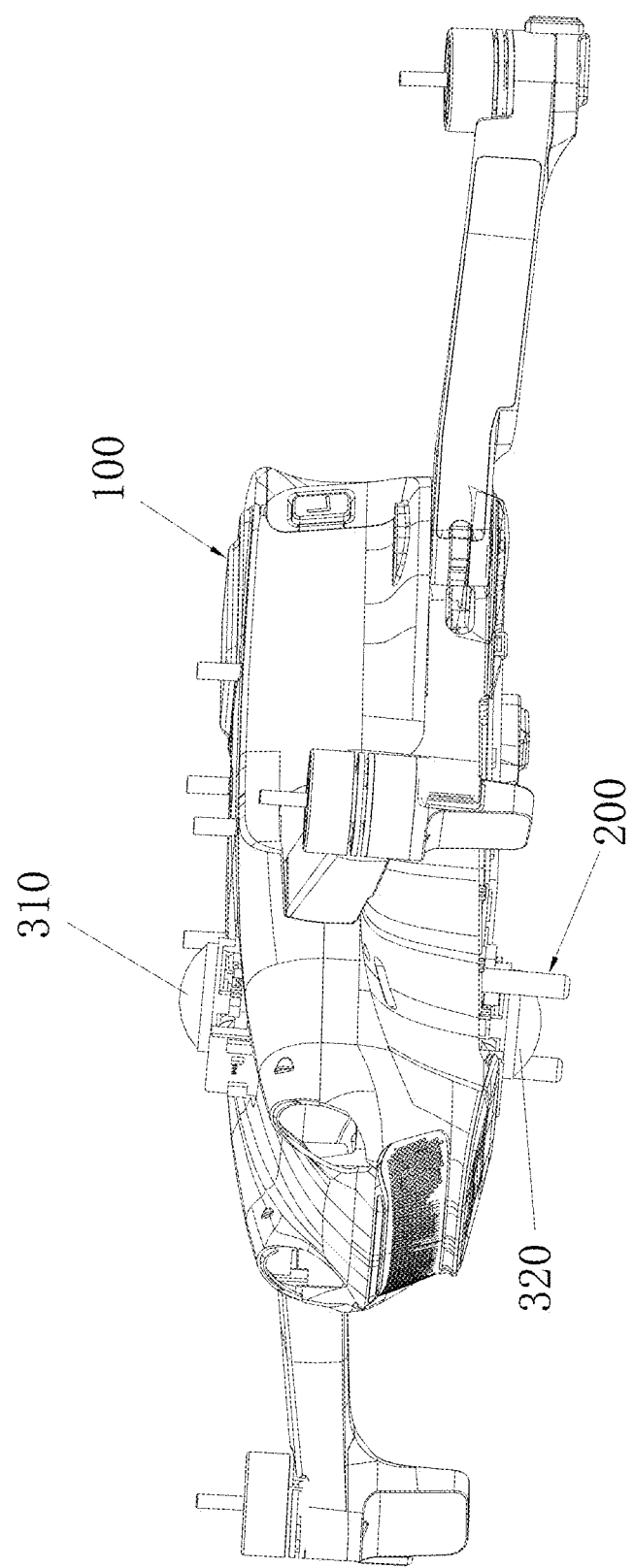
FIG. 2 is a three-dimensional schematic diagram of a top lens module on a UAV in a case that the top lens module is lowered with the landing gear according to an embodiment of the disclosure.
Figure 3:
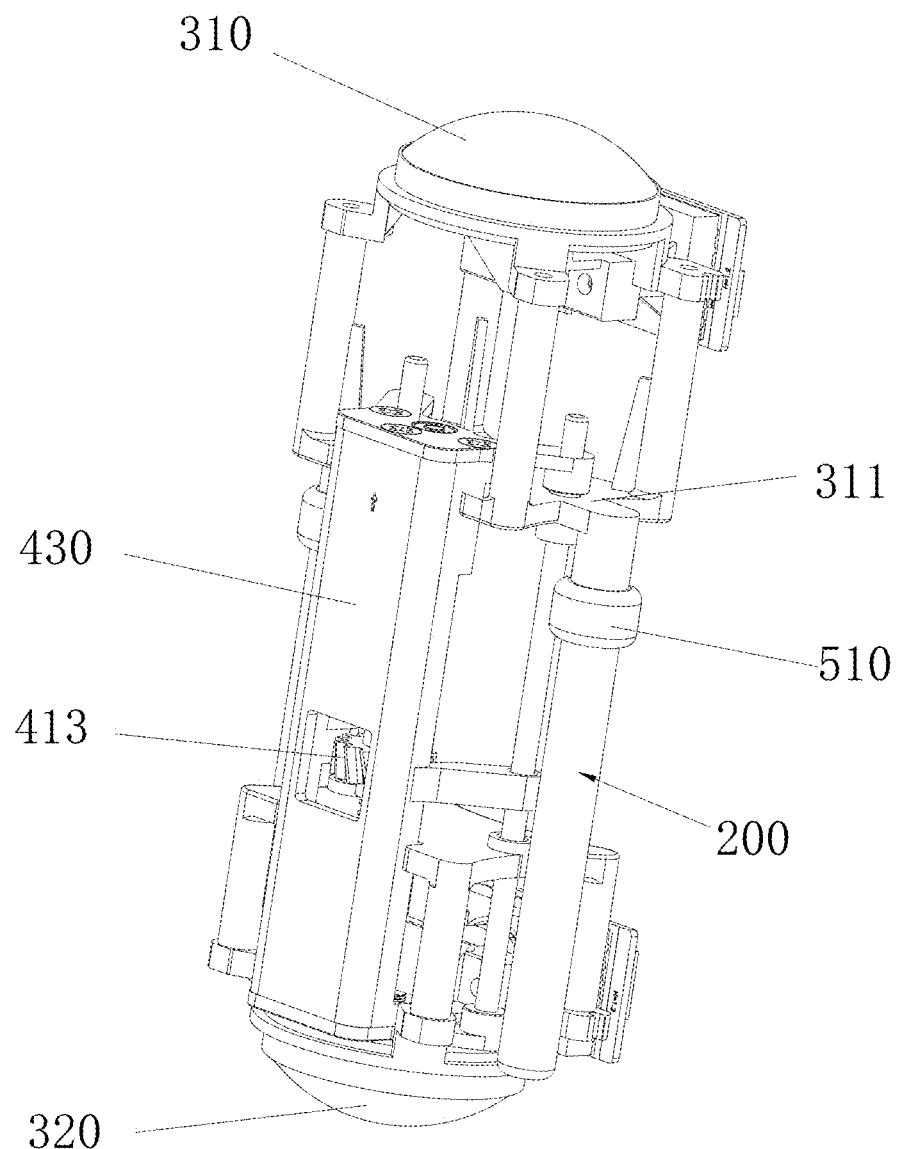
FIG. 3 is a schematic diagram of a three-dimensional assembly of a top lens module, a transmission component of a driving mechanism, a bottom lens module, and a landing gear in a UAV according to an embodiment of the disclosure (when the top lens module is raised with the landing gear)
Figure 4:
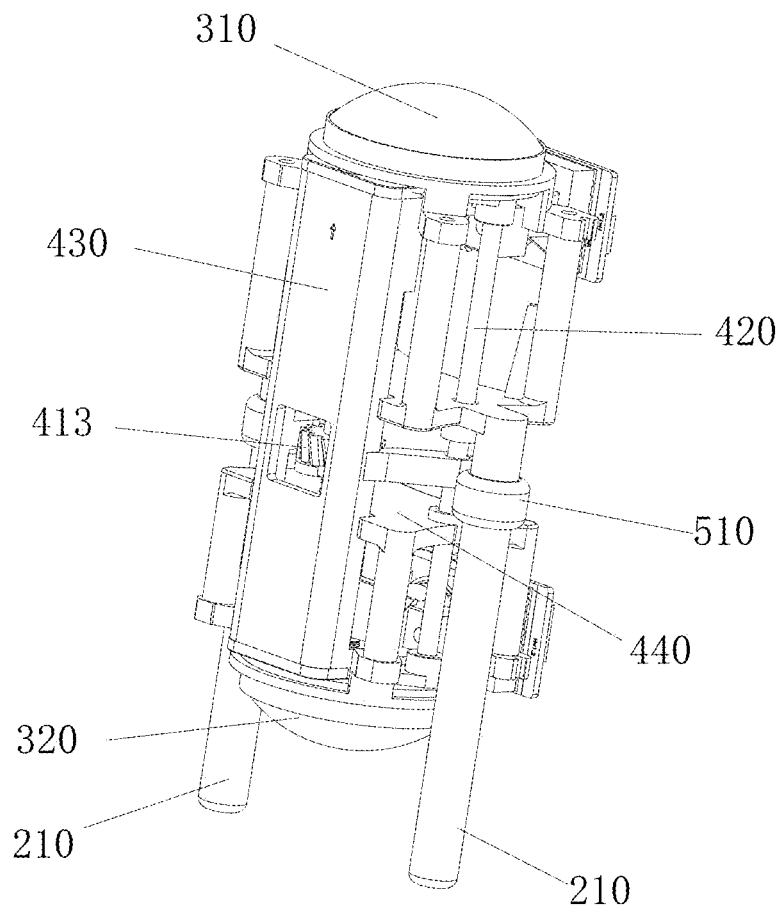
FIG. 4 is a schematic diagram of a three-dimensional assembly of a top lens module, a transmission component of a driving mechanism, a bottom lens module, and a landing gear in a UAV according to an embodiment of the disclosure (when the top lens module is lowered with the landing gear)
Figure 5:
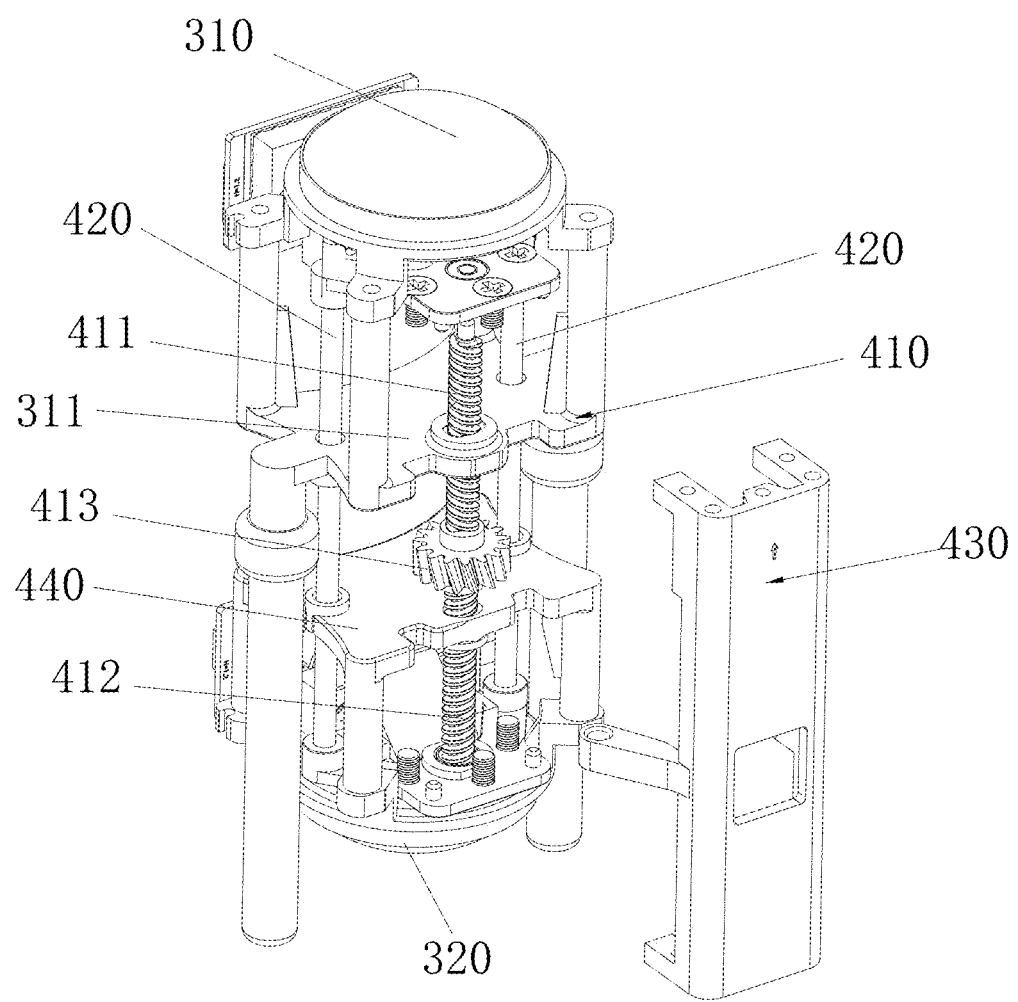
FIG. 5 is a schematic diagram of a three-dimensional decomposition of a top lens module, a transmission component of a driving mechanism, a bottom lens module and a landing gear in a UAV according to an embodiment of the disclosure (when the top lens module is lowered with the landing gear).

In one embodiment, when the landing gear 200 is lowered to a lower stopping point (as shown in FIGS. 2 and 4), the lowest point of the landing gear 200 is lower than the lowest point of the bottom lens module 320, so that when landing, the landing gear 200 can effectively protect the bottom lens module 320. When the landing gear 200 is lowered to the lower stopping point, the top lens module 310 also descends to a lower stopping point.

In one embodiment, when the landing gear 200 is retracted (as shown in FIG. 1), both the fuselage body 100 and the landing gear 200 is located outside the field of view of the bottom lens module 320, and the landing gear 200 does not interfere with panoramic imaging. When the landing gear 200 is expanded or lowered, the landing gear 200 may be located within the field of view of the bottom lens module 320 to protect the bottom lens module 320.

In one embodiment, the top lens module 310 is vertically slidably installed in the fuselage body 100, the landing gear 200 is vertically slidably installed in the fuselage body 100, the driving mechanism includes a power component and a transmission component, the power component is connected to the transmission component, the power component may be an electric power component, and the power component drives the top lens module 310 and the landing gear 200 through the transmission component, which leads to a reliable structure. The transmission component may be used to adjust the speed and torque of raising and lowering the landing gear 200 and/or the top lens module 310.

In one embodiment, the transmission component may be connected to the landing gear 200, and the top lens module 310 is connected to the landing gear 200, i.e., the transmission component drives the landing gear 200 to expand and retract, and the top lens module 310 is driven to be raised or descended by the expansion or retraction of the landing gear 200 respectively. The top lens module 310 may be fixedly connected to the top of the landing gear 200, and the bottom of the landing gear 200 is a support end that may extend out of the bottom of the fuselage body 100.

In one embodiment, the top lens module 310 and the landing gear 200 are each connected to the transmission component respectively, which causes both the top lens module 310 and the landing gear 200 to be raised and lowered, i.e., both the top lens module 310 and the landing gear 200 are directly connected to the transmission component respectively.

In one embodiment, the top lens module 310 is connected to the transmission component, and the landing gear 200 is connected to the top lens module 310, i.e., the transmission component drives the top lens module 310 to be raised and lowered, and the landing gear 200 is driven to expand and retract by the lowering and raising of the top lens module 310 respectively. It is also possible to realize that the top lens module 310 is raised or lowered with the retraction and lowering of the landing gear 200. In specific applications, the landing gear 200 and a lifting bracket 311 of the top lens module 310 can be fixedly connected together or independent from each other. The landing gear 200 and the top lens module 310 may have the same or approximately the same telescopic travel.

In one embodiment, the landing gear 200 is connected to the transmission component, the top lens module 310 is connected to a lifting bracket 311, the lifting bracket 311 is connected to the transmission component and is located above the landing gear 200, and the driving mechanism can be set between the lifting bracket 311 and the landing gear 200, i.e., the driving mechanism can be arranged in the middle of the fuselage body 100, with a compact and reasonable layout. Alternatively, the lifting bracket 311 may be fixedly connected with a top of the landing gear 200.

In one embodiment, the transmission component comprises a transmission mechanism or structure and a rotatable transmission rod 410, i.e. the transmission rod 410 drives the top lens module 310 and the landing gear 200 to be raised and lowered by rotation. The transmission rod 410 may be threadedly connected with the landing gear 200 as well as the lifting bracket 311 respectively, using a structural principle of screw transmission. The power component may be a motor, and the motor may be used to drive the transmission rod 410 to rotate. When the motor rotates, the transmission rod 410 is driven to rotate through the transmission mechanism, and when the transmission rod 410 rotates, the lifting bracket 311 is driven to be raised or lowered through the principle of screw transmission. A transmission mechanism is provided between the motor and the transmission rod 410, and the transmission mechanism may be a reduction mechanism, such as a reduction gear set, a reduction gearbox, and the like. The transmission rod 410 may be substantially perpendicular to the fuselage body 100, i.e. the transmission rod 410 is provided along the longitudinal or vertical direction.

In some embodiments, the transmission mechanism may be a gear transmission mechanism, a worm gear transmission mechanism, a belt transmission mechanism or a chain transmission mechanism, etc., with good transmission reliability.

In one embodiment, the transmission rod 410 has a first externally threaded segment 411 and a second externally threaded segment 412, the transmission rod 410 is connected to a follower gear 413, the motor is connected to an active gear that engages with the follower gear 413 or a worm gear that engages with the follower gear 413. For example, the transmission mechanism is a worm gear transmission mechanism, which is effective in transmission and has self-locking characteristics, and the top lens module 310 has better stability.

In one embodiment, the transmission rod 410 is disposed along the longitudinal direction of the fuselage body 100, the first externally threaded segment 411 and the second externally threaded segment 412 are near the upper and lower ends of the transmission rod 410, respectively, and the follower gear 413 is fixedly connected to the middle section of the transmission rod 410, and the follower gear 413 is located between the first externally threaded segment 411 and the second externally threaded segment 412 with a compact layout.

In one embodiment, the transmission component comprises a lifting member or structure that can be raised or lowered relative to the fuselage body 100. For example, the lifting member can be raised or lowered to drive the top lens module 310 and the landing gear 200 to rise and descend. The lifting member can be in the form of a rod, a plate, etc. Both the landing gear 200 and the lifting bracket 311 may be fixedly connected to the lifting member, or, alternatively, the lifting bracket 311 is fixedly connected to the lifting member, which has a simple and reliable structure.

In one embodiment, the lifting member is integrally provided with or fixedly connected to a rack, the power component includes a motor, a gear, the gear is sleeved on the rotating shaft of the motor, the gear meshes with the rack or is driven through a reduction component; alternatively, the power component is a linear motor for driving the lifting member to rise or descend or a servo for driving the lifting member to rise or descend, both of which can drive the lifting member and drive the landing gear 200 and the top lens module 310 to be raised or lowered. Of course, the driving mechanism may also take other driving forms.

In one embodiment, the landing gear 200 is provided with a vibration dampening component or damper 510, or the landing gear 200 is provided with a vibration dampening component 510 between the landing gear 200 and the transmission component to reduce the impact during landing. The vibration dampening component 510 may be an elastic component, such as a rubber, an airbag, a spring, or the like.

In one embodiment, the landing gear 200 includes at least two sets of legs 210, each of the legs 210 is located at a periphery of the bottom lens module 320. When the landing gear 200 is lowered (as shown in FIG. 4), it is more conducive to the protection of the bottom lens module 320. In one embodiment, the number of the legs 210 may be three or more than three. Optionally, the landing gear 200 may also include a lifting plate frame 440, each of the legs 210 is fixedly connected to the lower end of the lifting plate frame 440, the lifting plate frame 440 is located on top of the bottom lens module 320, the lifting plate frame 440 has threaded holes matching with the second externally threaded segment 412, and the second externally threaded segment 412 is threadedly connected to the threaded holes. Each of the legs 210 is disposed on the outer side of the bottom lens module 320, and when the UAV is landing, each of the legs 210 can descend with the lifting plate frame 440 to protect the bottom lens module 320.

In one embodiment, the vibration dampening component 510 may be a resilient member connected to the legs 210, with a good anti-impact effect.

In one embodiment, the fuselage body 100 has an upper camera aperture at the top, and the top lens module 310 may be raised out of the upper camera aperture. The fuselage body 100 is provided with a mounting bracket 400 for mounting the driving mechanism, the mounting bracket 400 can be fixedly connected to the fuselage body 100, and the mounting bracket 400 is located at a place below the upper camera aperture. The fuselage body 100 has a landing gear aperture at the bottom of the fuselage body 100, and the landing gear aperture is located at a place below the mounting bracket 400. The mounting bracket 400 may be a stand-alone bracket and secured within the fuselage body 100, providing a high degree of integration and case of design and assembly. Alternatively, the mounting bracket 400 may be a fuselage bracket.

In one embodiment, the mounting bracket 400 may comprise a longitudinal guide bar 420 disposed in the vertical direction along the fuselage body 100, the top lens module 310 (lifting bracket 311) or/and the landing gear 200 (lifting plate frame 440) are slidably connected to the longitudinal guide bar 420, and the mounting bracket 400 further comprises a power fixing plate 430, the power fixing plate 430 is located on one side of the longitudinal guide bar 420, the power component (motor) being fixedly connected to the power fixing plate 430, thereby enabling a reasonable and compact layout.

In one embodiment, the driving mechanism is connected with a detector for detecting the take-off and landing state of the UAV and driving the top lens module 310 to be raised or lowered automatically with the landing gear 200, with high reliability. That is, when the driving mechanism is controlled to make the landing gear 200 to be lowered, the top lens module 310 is synchronously lowered, and the overall appearance of the UAV is not obtrusive. After take-off, the driving mechanism is controlled so that the landing gear 200 is retracted, and the top lens module 310 is synchronously raised upward to meet the demand for panoramic shooting, which can be applied to UAVs with a large lateral size, and the maximum field of view of the top lens module 310 does not need to be too large to avoid distortion. Since the shooting state and the landing state are mutually exclusive, a set of driving mechanism can be utilized as an actuator to complete the two states. When the top lens module 310 is raised upwardly to protrude, the landing gear 200 is retracted upwardly, and when the top lens module 310 is retracted downwardly, the landing gear 200 is lowered downwardly.

Some embodiments of the present disclosure provide a UAV whose top lens module 310 and landing gear 200 can share a set of driving mechanism, so that the top lens module 310 and the landing gear 200 can be raised and lowered synchronously. When taking panoramic images during flight, the landing gear 200 is retracted (raised), and at the same time, the top lens module 310 is raised relative to the fuselage body 100 to increase the splicing fusion angle and prevent the landing gear 200 from affecting the imaging of the bottom lens module 320. Only one set of driving mechanism is required to make the top lens module 310 and the landing gear 200 to be raised and lowered synchronously. As such, the structure is simple and reliable with low cost and conducive to reducing the weight and increasing the endurance.

The above are some embodiments of the present disclosure, and are not intended to limit the present disclosure, and any modifications, equivalent replacements or improvements made within the spirit and principles of the disclosure shall be included in the scope of protection of the disclosure.

The above-described embodiments express only several embodiments of the present application, which are described in a more specific and detailed manner, but are not to be construed as a limitation of the scope of the patent of the present application. It should be pointed out that for a person of ordinary skill in the art, several modifications and improvements can be made without departing from the conception of the present application, which all fall within the scope of protection of the present application. Therefore, the scope of protection of this application shall be subject to the attached claims.

What is claimed is:

1. A unmanned aerial vehicle (UAV), comprising:
a fuselage body,
a top lens module at a top of the fuselage body, the top lens module protruding from the top of the fuselage body;
a bottom lens module at a bottom of the fuselage body, the bottom lens module protruding from the bottom of the fuselage body:
a landing gear movably disposed on the fuselage body; and
a driver on the fuselage body,
wherein the driver is transmission connected with the landing gear, and
the driver is configured to drive the landing gear to move so that a bottom end of the landing gear protrudes from a bottom end of the bottom lens structure or the bottom end of the landing gear is outside a field of view of the bottom lens structure.

2. The UAV according to claim 1, wherein the driver is transmission connected to the top lens module, and
the driver is configured to drive the bottom end of the landing gear so that the bottom end of the landing gear is outside the field of view of the bottom lens module while simultaneously making the top lens module at least partially protrude from the top of the fuselage body.

3. The UAV according to claim 1, wherein the top lens structure comprises a panoramic camera; the bottom lens module comprises a panoramic camera; and the fuselage body and the landing gear are both located outside fields of view of the top lens structure and the bottom lens structure in a case that the top lens structure is raised to an upper stopping point.

4. The UAV according to claim 1, wherein the top lens structure and bottom lens structure are coaxially arranged.

5. The UAV according to claim 1, wherein the top lens structure is vertically slidably installed on the fuselage body, the landing gear is vertically slidably installed on the fuselage body, and the driver comprises a power component and a transmission component, and the power component is connected to the transmission component; and
wherein the transmission component is directly connected to the landing gear, and the top lens structure is directly connected to the landing gear; or
the top lens structure and the landing gear are respectively directly connected to the transmission component; or
the top lens structure is directly connected to the transmission component, and the landing gear is directly connected to the top lens structure.

6. The UAV according to claim 5, wherein the landing gear is directly connected to the transmission component, the top lens structure is connected to a lifting bracket, and the lifting bracket is fixedly connected to the landing gear;
the transmission component includes a transmission structure and a rotatable transmission rod, the rotatable transmission rod is threadedly connected with the lifting bracket, and the transmission structure is arranged between the power component and the rotatable transmission rod; and
in a case that the power component rotates, the rotatable transmission rod is driven to rotate through the transmission structure, and the rotatable transmission rod in turn drives the lifting bracket to raise or lower the lifting bracket when the rotatable transmission rod rotates.

7. The UAV according to claim 6, wherein the rotatable transmission rod comprises a first externally threaded segment and a second externally threaded segment, the first externally threaded segment and the second externally threaded segment are disposed near the upper and lower ends of the rotatable transmission rod, respectively.

8. The UAV according to claim 7, wherein the rotatable transmission rod is fixedly connected to a follower gear, and the motor is connected to an active gear that engages with the follower gear or a worm gear that engages with the follower gear.

9. The UAV according to claim 8, wherein the follower gear is located between the first externally threaded segment and the second externally threaded segment.

10. The UAV according to claim 6, wherein the transmission structure is a gear transmission structure, a worm gear transmission structure, a belt transmission structure or a chain transmission structure.

11. The UAV according to claim 6, wherein the top of the fuselage body has an upper camera aperture, the fuselage body includes a mounting bracket for mounting the driver, the mounting bracket is fixedly connected to the fuselage body and the mounting bracket is located below the upper camera aperture, and the bottom of the fuselage body has a landing gear aperture, and the landing gear aperture is located below the driver.

12. The UAV according to claim 11, wherein the mounting bracket comprises a longitudinal guide bar disposed in a vertical direction along the fuselage body, the lifting bracket or/and the landing gear are slidably connected to the longitudinal guide bar, and the mounting bracket further comprises a power fixing plate, the power fixing plate is disposed on one side of the longitudinal guide bar, and the power component is fixedly connected to the power fixing plate.

13. The UAV according to claim 5, wherein the landing gear is provided with a vibration damper between the landing gear and the transmission component, and the damper is a rubber, an airbag, or a spring.

14. The UAV according to claim 1, wherein the driver is connected to a detector for detecting take-off and landing states of the UAV and driving the top lens structure to synchronously raise or lower the top lens structure with the landing gear.

15. The UAV according to claim 1, wherein the landing gear and the top lens structure have same telescopic travel.

16. The UAV according to claim 1, wherein the landing gear includes at least two sets of legs, and each of the legs is located at a periphery of the bottom lens structure.

17. The UAV according to claim 16, wherein the landing gear further includes a lifting plate frame, the at least two sets of legs are fixedly connected to the lifting plate frame, and the lifting plate frame is located on top of the bottom lens structure.

18. The UAV according to claim 17, wherein the lifting plate frame has a threaded hole, and the lifting plate frame is connected to a transmission component of the driver through the threaded hole.

19. The UAV according to claim 1, wherein the driver is configured to drive the landing gear and the top lens structure to lower or raise the landing gear and the top lens structure synchronously to switch between a landing state and a shooting state, wherein during the landing state, the bottom end of the landing gear protrudes from the bottom end of the bottom lens structure to protect the bottom lens structure while the top lens structure retracts into the fuselage body, and during the shooting state, the landing gear is located outside a field of view of the bottom lens structure while the top lens structure protrudes at least partially over the top of the fuselage body.

* * * * *